United States Patent [19]

Boudreaux, Jr.

[11] Patent Number: 5,216,061

[45] Date of Patent: Jun. 1, 1993

[54] PROCESS TO GRAFT STEREOREGULAR POLYMERS OF BRANCHED, HIGHER ALPHA-OLEFINS AND COMPOSITIONS THEREOF

[75] Inventor: Edwin Boudreaux, Jr., Bartlesville, Okla.

[73] Assignee: Phillips Petroleum Company, Bartlesville, Okla.

[21] Appl. No.: 639,869

[22] Filed: Jan. 11, 1991

[51] Int. Cl.$^5$ ............................ C08K 5/36; C08K 5/49
[52] U.S. Cl. .................................. 524/392; 524/128; 524/291; 524/305; 524/348; 524/494; 524/710; 524/718; 524/739
[58] Field of Search ............... 524/392, 710, 718, 739, 524/128, 291, 305, 348, 494; 523/506, 507, 508, 510; 525/342, 343, 345

[56] References Cited

U.S. PATENT DOCUMENTS

| | | | |
|---|---|---|---|
| 4,011,196 | 3/1977 | Carevic et al. | 524/739 |
| 4,170,589 | 10/1979 | Goeke et al. | 524/739 |
| 4,888,394 | 12/1989 | Boudreaux | 525/285 |
| 4,900,772 | 2/1990 | Imanaka et al. | 524/392 |
| 4,963,607 | 10/1990 | Reilly et al. | 524/392 |
| 5,051,460 | 9/1991 | Kirsch et al. | 524/114 |

FOREIGN PATENT DOCUMENTS

0438096A1 7/1991 European Pat. Off. .
0443540A1 8/1991 European Pat. Off. .

OTHER PUBLICATIONS

*Novel Sulfide Antioxidant Stabilizes Polyolefins and ABS,* vol. 34, No. 4, Plastics Technology, p. 28 (Apr. 1988).
Braksmayer *Antioxidant synergist cuts odor, protects color,* vol. 66, No. 1, Modern Plastics, p. 122 (Jan. 1989).
Callais and Kazmierczak *The Maleic Anhydride Grafting of Polypropylene with Organic Peroxides,* ANTEC '90, p. 1921 (1990).

*Primary Examiner*—Kriellion S. Morgan
*Attorney, Agent, or Firm*—Carl D. Corvin

[57] ABSTRACT

Hindered phenol stabilized, stereoregular polymers of branched, higher alpha-olefins can be modified with unsaturated silanes, carboxylic acids, and/or carboxylic acid anhydrides in the presence of a free radical generator in the polymer melt. These polymers can also contain additional additives, such as glass fibers. An aliphatic thio compound is added after the grafting procedure for maximum beneficial effect.

30 Claims, No Drawings

PROCESS TO GRAFT STEREOREGULAR POLYMERS OF BRANCHED, HIGHER ALPHA-OLEFINS AND COMPOSITIONS THEREOF

BACKGROUND OF THE INVENTION

Polyolefins tend to have excellent physical and chemical properties. Improvement of polymer properties is a dominant factor in the development and production of olefin polymers. Several methods have been employed to improve various polymer properties. The prior art teaches that reinforcing agents, such as glass, can be incorporated into the polymer to improve the mechanical properties and/or the heat resistance of the polymer. However, these improved properties cannot be attained by merely mixing the glass fibers and the polyolefins together because the bonding strength between the glass fibers and the polyolefin is weak. Thus, such polymers must have a more "bondable" component grafted thereon to facilitate reinforcement with glass fibers and other generally infusible reinforcing agents.

Polymers with relatively high melting points, such as stereoregular polymers of branched, higher alpha-olefins, have been developed. These polymers are useful in high temperature applications, such as microwave packaging. Improving the performance and/or properties of these polymers could expand the uses of these polymers. Because of the relatively high melting points and even higher melt processing temperatures, these polymers can be thermally unstable. Therefore, it is difficult to graft, and optionally reinforce, stereoregular polymers of branched, higher alpha-olefins in a melt process, as can be done with other polyolefins such as polyethylene or polypropylene.

Grafting, or chemically modifying, polyolefins, especially relatively low melting point polymers, such as polyethylene and polypropylene, can be done alone or in combination with the addition of a reinforcing agent. The prior art teaches many grafting compounds, as well as several grafting processes. Grafting usually is done in the presence of a free radical generator and usually by a solution or melt process. Unfortunately, the presence of a free radical generator is also known to cause degradation of the polymer. Furthermore, a melt grafting process is also known to be detrimental to the properties of stereoregular polymers of branched, higher alpha-olefins.

Polyolefins are vulnerable to thermal-oxidative degradation due to exposure to heat or oxygen during processing and/or storage. To preserve desirable polymer properties, an antioxidant or stabilizer is sometimes used to inhibit discoloration and/or molecular deterioration. An unstabilized polyolefin can be susceptible to rapid deterioration over time. Unfortunately, the use of a stabilizer can have a detrimental effect on the grafting process because stabilizers function as radical scavengers and peroxide decomposers and consequently stabilizers can hinder, if not halt, the grafting process.

Recently, a new class of aliphatic thio compounds has been introduced to the market. See *Novel Sulfide Antioxidant Stabilizes Polyolefins and ABS*, Vol. 34, No. 4, Plastics Technology, p. 28 (April 1988). This new class of aliphatic thio compounds has been disclosed as giving superior high performance properties when used with polyolefins. See Braksmayer *Antioxidant synergist cuts odor, protects color*, Vol. 66, No. 1, Modern Plastics, p. 122 (January 1989). It was disclosed recently that this class of aliphatic thio compounds, in particular Anoxsyn TM 442, did not interfere with grafting reactions. See Callais and Kazmierczak *The Maleic Anhydride Grafting of Polypropylene with Organic Peroxides*, ANTEC '90, p. 1921 (1990). It was soon discovered that the Anoxsyn TM 442 while imparting certain beneficial properties, also produced a significant decline in the mechanical properties of the polyolefin composition it was in. Consequently, before the beneficial properties of the aliphatic thio compounds could be used, the antagonistic interaction between the grafting reaction and the aliphatic thio compounds must be reduced.

SUMMARY OF THE INVENTION

It is an object of this invention to provide an improved olefin polymer.

It is another object of this invention to provide an olefin polymer with improved thermal and mechanical properties.

It is yet another object of this invention to provide a stereoregular polymer of branched, higher alpha-olefins with improved thermal and mechanical properties.

It is yet another object of this invention to provide an improved process to graft a stabilized stereoregular polymer of branched, higher alpha-olefins.

It is still another object of this invention to provide an improved process to reinforce with glass fibers a grafted, stabilized, stereoregular polymer of branched, higher alpha-olefins.

In accordance with this invention, a hindered phenol stabilized, stereoregular polymer of branched, higher alpha-olefins is contacted in a melt with a grafting compound selected from the group consisting of vinylpolymerizable, unsaturated, hydrolyzable silanes; carboxylic acids; carboxylic acid derivatives; carboxylic acid anhydrides; and mixtures thereof, in the presence of a free radical generator. Thereafter, an aliphatic thio compound, and optionally a reinforcer, are added in desired amounts to achieve the desired properties of the polymer.

DETAILED DESCRIPTION OF THE INVENTION

Polymers

This invention is particularly applicable to olefinic polymers which have a melting point higher than about 180° C., more preferably, a melting point of greater than about 190° C. Polymers produced from linear monomers, such as ethylene, propylene, butene, and hexene, usually have a lower melting point than polymers of branched, higher alpha-olefins. Thus, the polymers useful in this invention are homopolymers and copolymers of branched, higher alpha-olefins. The preferred alpha-olefin monomers have from about 5 to 12 carbon atoms. Exemplary monomers include, but are not limited to, 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMH1), and other similar monomers. Most preferably, polymers of 4MP1 also called polymethylpentene (PMP), and 3MB1 also called polymethylbutene (PMB), are utilized in this invention. Table I gives the approximate melting point of each homopolymer listed above.

TABLE I

| Polymerized Monomer | Approx. Melting Temp., °C. |
| --- | --- |
| 3MB1 | 300 |
| 3MP1 | 370 |
| 4MP1 | 240 |
| 4MH1 | 196 |
| 3,3DMB1 | 400 |
| 4,4DMH1 | 350 |

The term "polymer", as used in this disclosure, includes homopolymers, as well as copolymers. Copolymers comprise the product resulting from combining a branched, higher alpha-olefin with any other olefin monomer or monomers. For example, a branched, higher alpha-olefin can be polymerized in the presence of, or in series with, one or more olefin monomers. Generally, applicable comonomers have from about 2 to about 18 carbon atoms and preferably, have from about 8 to about 16 carbon atoms. Most preferably, the comonomer or comonomers are linear alpha-olefins. Longer chain linear olefins are preferred in that they are easier to copolymerize with higher, branched alpha-olefins and can impart increased clarity, stability, and impact strength to the resultant polymer. Exemplary comonomers include, but are not limited to, 1-octene, 1-decene, 1-dodecene, 1-tetradecene, 1-hexadecene, and other higher olefins. A polymer can also be obtained by physically blending homopolymers and/or copolymers.

In general, it is preferred for the polymer to comprise at least about 85 mole percent moieties derived from higher, branched alpha-olefins, and more preferably, at least about 90 mole percent. Most preferably, the polymer comprises at least about 95 mole percent moieties derived from higher, branched alpha-olefins, which results in a polymer of superior strength and a high melting point.

After the polymer has been produced, it is essential, according to this invention, that the polymer be given a prophylatic charge with a hindered phenol before additional processing of the polymer. The hindered phenol acts as an antioxidant and improves the heat, light, and/or oxidation stability of the polymer. As a result of the prophylactic charge, the polymer product can withstand drying and storage after the polymerization process. Any hindered phenol in an amount which improves the heat, light, and/or oxidation stability of the polymer is applicable. Exemplary hindered phenol compounds include, but are not limited to:

2,6-di-tert-butyl-4-methylphenol;
tetrakis(methylene 3-(3,5-di-tert-butyl-4-hydroxyphenyl)propionate) methane;
thiodiethylene bis(3-(3,5-di-tert-butyl-4-hydroxyphenyl)propionate);
1,3,5-tris(3,5-di-tert-butyl-4-hydroxybenzyl)isocyanurate;
1,3,5-trimethyl-2,4,6-tris(3,5-di-tert-butyl-4-hydroxybenzyl)benzene;
2,2'-methylene bis(4-methyl-6-tert-butylphenol);
octadecyl 3-(3,5-di-tert-butyl-4-hydroxyphenyl)propionate;
1,3,5-tris(4-tert-butyl-3-hydroxy-2,6-dimethylbenzyl)-s-triazine-2,4,6-(1H, 3H, 5H)trione; and mixtures thereof.

Preferably the hindered phenol antioxidant used for the prophylactic charge is selected from the group consisting of:

2,6-di-tert-butyl-4-methylphenol;
tetrakis(methylene 3-(3,5-di-tert-butyl-4-hydroxyphenyl)propionate)methane;
octadecyl 3-(3,5-di-tert-butyl-4-hydroxyphenyl)propionate;
1,3,5-tris(4-tert-butyl-3-hydroxy-2,6-dimethylbenzyl)-s-triazine-2,4,6-(1H, 3H, 5H)trione;
1,3,5-tris(3,5-di-tert-butyl-4-hydroxybenzyl)isocyanurate;

and mixtures thereof, because of ease of use, availability, and economic reasons.

In addition to the essential prophylactic charge of hindered phenol, other antioxidants or stabilizers can be added to further stabilize the polymer. The type(s) of stabilizer(s) used depends on the final application or use of the polymer. Numerous polymer additives are commercially available and are usually selected from the group consisting of other hindered phenols, organic phosphites, hindered amine light stabilizers, thioesters, aliphatic thio compounds, and mixtures thereof.

The other hindered phenols useful in this invention include all of those previously listed as useful for the prophylactic charge. Preferably, the other hindered phenols are selected from the group consisting of
tetrakis(methylene 3-(3,5-di-tert-butyl-4-hydroxyphenyl)propionate)methane;
1,3,5-trimethyl-2,4,6-tris(3,5-di-tert-butyl-4-hydroxybenzyl) benzene;
1,3,5-tris(4-tert-butyl-3-hydroxy-2,6-dimethylbenzyl)-s-triazine-2,4,6-(1H, 3H, 5H)trione;
1,3,5-tris(3,5-di-tert-butyl-4-hydroxybenzyl)isocyanurate;
and mixtures thereof, because they are high surface area hindered phenols that are less likely to diffuse from the polymer at elevated temperatures.

The organic phosphites useful in this invention can be any aliphatic, aromatic, or aliphatic-aromatic phosphite and thiophosphite. Exemplary diphosphite compounds include, but are not limited to:
bis(2,4-di-tert-butyl)pentaerythritol diphosphite;
tetrakis(2,4-di-tert-butylphenyl)4,4'-biphenylylene diphosphonite;
distearyl pentaerythritol diphosphite;
trisnonylphenyl phosphite;
tris(2,4-di-tert-butylphenyl) phosphite;
diisodecyl pentaerythritol diphosphite;
tetraphenyl dipropyleneglycol diphosphite; and mixtures thereof.

Preferably, the organic phosphites useful in this invention are selected from the group consisting of:
bis(2,4-di-tert-butyl)pentaerythritol diphosphite;
tetrakis(2,4-di-tert-butyl-phenyl)4,4'biphenylylene diphosphonite;
distearyl pentaerythritol diphosphite;
diisodecyl pentaerythritol diphosphite; and mixtures thereof.

Preferably, substituted pentaerythritol diphosphites are used because they are less volatile and more stable at the high temperatures required to process stereoregular polymers of branched, higher alpha-olefins.

Hindered amine light stabilizers, such as, for example, polymeric hindered amines like piperidenyl triazine polymers and piperidenyl triazine derivative polymers, are also useful in this invention. These types of piperidenyl triazine polymers are disclosed in U.S. Pat. No. 4,086,204, herein incorporated by reference. Examples of hindered amine light stabilizers include, but are not limited to:

poly[[6-[(1,1,3,3-tetramethylbutyl)amino]-5-triazine-2,4-diyl]-[(2,2,6,6-tetramethyl-4-piperidyl)imino] hexamethylene-[2,2,6,6-tetramethyl-4-piperidyl)imino]];

2-(3',5'-di-tert-butyl-2'-hydroxyphenyl)-5-chlorobenzotriazole;

bis(2,2,6,6-tetramethyl-4-piperridinyl)sebacate;

bis(1,2,2,6,6-pentamethyl-4-piperridinyl)sebacate;

n-butyl-(3,5-di-tert-butyl-4-hydroxybenzyl)bis-(1,2,2,6,6-pentamethyl-4-piperridinyl)malonate;

and/or dimethyl succinate polymer with 4-hydroxy-2,2,6,6-tetramethyl-1-piperidine ethanol.

Preferably, the hindered amine light stabilizers useful in this invention are selected from the group consisting of:

dimethyl succinate polymer with 4-hydroxy-2,2,6,6-tetramethyl-1-piperidine ethanol;

poly[[6-[(1,1,3,3-tetramethylbutyl)amino]-5-triazine-2,4-diyl]-[(2,2,6,6-tetramethyl-4-piperidyl)imino]-hexamethylene-[2,2,6,6-tetramethyl-4-piperidyl)imino]]; and mixtures thereof because they are polymeric, and therefore less volatile at high temperatures.

The thioesters useful in this invention, include, but are not limited to:
dilaurylthiodiproprionate;
distearylthiodiproprionate;
dimyristylthiodiproprionate;
ditridecylthiodiproprionate;
pentaerythritol tetrakis (3-(dodecylthio) proprionate);
and mixtures thereof.

Preferably the thioesters useful in this invention are selected from the group consisting of:
dilaurylthiodiproprionate;
distearylthiodiproprionate; and mixtures thereof.

While the above described thio esters have aliphatic groups in their structure, the term "aliphatic thio compound" as used in this invention is meant to refer to compounds described generally by the formula $C_aH_{2a+1}$—S—R—S—$C_bH_{2b+1}$, where a is independently an integer from 4 to 30 inclusive, b is independently an integer from 4 to 30 inclusive, R is a chain or cyclic hydrocarbon radical represented by either $C_dH_{2d}$ or $C_gH_{2g-2}$ and d or g is independently an integer from 3 to 12 inclusive. A preferred aliphatic thio compound is $C_{18}H_{37}$—S—$C_8H_{14}$—S—$C_{18}H_{37}$.

Although a compound which fits the above formula is available commercially from Atochem North America as Anoxsyn ™ 442 (an aliphatic thio compound), aliphatic thio compounds described generally by the above formula can be made by reacting a dichloride, Cl—R—Cl, with the mercaptans $R^1$—SH and $R^2$—SH, where R is as set forth above, $R^1$ is $C_aH_{2a+1}$, $R^2$ is $C_bH_{2b+1}$, and a and b are as set forth above. The dichloride, which can be derived from the corresponding dialcohol, is heated, if necessary, to liquid phase, and the reaction can be run at that temperature. Otherwise, the reaction can be run at ambient temperature. The reaction can also be run in the presence of a solvent such as benzene.

The total polymer stabilizer package that can be added prior to grafting, which comprises the essential hindered phenol antioxidant prophylactic charge, and the optional additional hindered phenol, organic phosphite, thioesters and/or hindered amine light stabilizer, is usually added to the polymer in the range of about 0.05 to about 2 parts by weight of total stabilizer(s) per 100 parts by weight of polymer (phr). Preferably, the hindered phenol propylactic charge comprises an amount in the range of about 0.1 to about 1 phr, and most preferably in an amount in the range of about 0.1 to about 0.8 phr. If insufficient hindered phenol is present, oxidative degradation of the polymer can occur. The presence of excess hindered phenol can interfere with the grafting process. If desired, additional stabilizers, i.e., in excess of 2 phr, can be added any time after the grafting process, depending on the desired polymer properties.

It is essential for this invention that the aliphatic thio compound be added after the grafting procedure has occurred. This is because the aliphatic thio compound interferes with the grafting procedure to a significant extent. Although the aliphatic thio compound can be beneficial to the polymer, the overall effect of adding an aliphatic thio compound to the polymer before or concurrently with the grafting procedure is a significant lowering of the mechanical properties of the polymer. The amount of aliphatic thio compound to add to the polymer is usually in the range of about 0.05 to about 2 parts per 100 parts by weight of polymer. Preferably, the aliphatic thio compound is added in an amount which is in the range of about 0.1 to about 1 part per 100 parts by weight of polymer, and most preferably in an amount in the range of about 0.1 to about 0.8 parts per 100 parts by weight of polymer. If too much aliphatic thio compound is added no additional appreciable polymer property improvement is obtained. If too little aliphatic thio compound is added the beneficial effects of adding it will not be noticed.

Other additives can optionally be incorporated into the polymer, before and after grafting, to achieve additionally desired beneficial polymer properties. General exemplary additives include, but are not limited to, antioxidants, antioxidant synergists, UV absorbers, nickel stabilizers, pigments, plasticizing agents, optical brighteners, antistatic agents, flame retardants, lubricating agents, more anticorrosive agents, metal inhibitors, and the like. Processing lubricants can also be added to enhance polymer properties. Examples of processing lubricants include, but are not limited to, fatty acids containing about 10 to about 20 carbon atoms and the metal salts thereof. Usually, metal stearates, such as, for example, calcium stearate and zinc stearate, and/or metal laurates are used as processing lubricants and/or acid scavengers for polyolefins. If corrosion is a potential problem, one or more corrosion inhibitors can be added.

Any additive can be combined with the polymer according to any method known in the art. Examples of incorporation methods include, but are not limited to, dry mixing, in the form of a powder, and wet mixing in the form of a solution or slurry. In these types of methods, the polymer can be in any form, such as fluff, powder, granulate, pellet, solution, slurry, and/or emulsion. For ease of operation, the initial prophylactic charge of hindered phenol is usually solution or slurry mixed with the polymer prior to drying and handling of the polymer. Any additional stabilizers or additives, except for the aliphatic thio compound, can be blended with the polymer prior to grafting, added to the polymer melt during the grafting, or optional glass reinforcing, process, and/or added during reprocessing of the grafted, and optionally glass reinforced, polymer.

Grafting

The stabilized, stereoregular polymers of branched, higher alpha-olefins are modified by grafting with a radically polymerizable unsaturated grafting compound selected from the group consisting of vinyl-polymerizable, unsaturated, hydrolyzable silane compounds, carboxylic acids and derivatives, carboxylic acid anhydrides and derivatives, and mixtures thereof, in the presence of a free radical generator.

The vinyl-polymerizable unsaturated, hydrolyzable silanes used in this invention contain at least one silicon bonded hydrolyzable group, such as, for example, alkoxy, halogen, and acryloxy, and at least one silicon bonded vinyl-polymerizable unsaturated group such as, for example, vinyl, 3-methacryloxypropyl, alkenyl 3-acryloxpropyl, 6-acryloxyhexyl, alkyloxypropyl, ethynyl, and 2-propynyl and preferably is an ethylenically unsaturated group. Any remaining valances of silicon not satisfied by a hydrolyzable group or a vinyl-polymerizable unsaturated group being satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$R_a SiX_b Y_c$ wherein R is a monovalent hydrocarbon group, X is a silicon-bonded hydrolyzable group, Y is a silicon-bonded monovalent organic group containing at least one vinyl-polymerizable unsaturated bond, a is an integer from 0 to 2, preferably 0; b is an integer from 1 to 3, preferably 3; c is an integer of 1 to 3, preferably 1; and a+b+c is equal to 4.

Suitable vinyl-polymerizable unsaturated hydrolyzable silanes that can be used in this invention include, but are not limited to:
3-acryloxypropyltriethoxysilane;
ethynyltriethoxysilane;
2-propynyltrichlorosilane;
3-acryloxypropyldimethylchlorosilane;
3-acryloxypropyldimethylmethoxysilane;
3-acryloxypropylmethyldichlorosilane;
3-acryloxypropyltrichlorosilane;
3-acryloxypropyltrimethoxysilane;
allyldimethylchlorosilane;
allylmethyldichlorosilane;
allyltrichlorosilane;
allyltriethoxysilane;
allyltrimethoxysilane;
chloromethyldimethylvinylsilane;
[2-(3-cyclohexenyl)ethyl]dimethylchlorosilane;
2-(3-cyclohexenyl)ethyltrimethoxysilane;
3-cyclohexenyltrichlorosilane;
diphenylvinylchlorosilane;
diphenylvinylethoxysilane;
(5-hexenyl)dimethylchlorosilane;
(5-hexenyl)dimethylchlorosilane;
5-hexenyltrichlorosilane;
methacryloxypropyldimethylchlorosilane;
3-methacryloxypropyldimethylethoxysilane;
3-methacryloxypropylmethyldiethoxysilane;
3-methacryloxypropyltrichlorosilane;
methyl-2(3-cyclohexenyl)-ethyldichlorosilane;
methyl-3-(trimethylsiloxy)crotonate;
7-octenyltrichlorosilane;
7-octenyltrimethoxysilane;
1-phenyl-1-trimethylsiloxyethylene;
phenylvinyldichlorosilane;
styrylethyltrimethoxysilane;
1,3-tetradecenyltrichlorosilane;
4-[2-(trichlorosilyl)ethyl]cyclohexene;
2-(trimethylsiloxy)ethylmethacrylate;
3-(trimethylsilyl)cyclopentene;
vinyldimethylchlorosilane;
vinyldimethylethoxysilane;
vinylethyldichlorosilane;
vinylmethyldiacetoxysilane;
vinylmethyldichlorosilane;
vinylmethyldiethoxysilane;
vinyltrimethylsilane;
vinyltrichlorosilane;
vinyltriethoxysilane;
vinyltrimethoxysilane;
vinyltris(beta-methoxyethoxy)silane;
vinyltriacetoxysilane;
3-methacryloxypropyltrimethoxysilane; and
3-methacryloxypropyltris(beta-methoxyethoxy)silane.

The preferred silane compounds are:
vinyltrichlorosilane;
vinyltriethoxysilane;
vinyltrimethoxysilane;
vinyltris(beta-methoxyethoxy)silane;
vinyltriacetoxysilane;
3-methacryloxypropyl trimethoxysilane;
3-methacryloxypropyltris(beta-methoxyethoxy)silane, and mixtures thereof.

These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itaconic acid, citraconic acid, allyl succinic acid, mesaconic acid, glutaconic acid, Nadic acid (Trademark: norbornene-2,3-dicarboxylic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (Trademark: norbornene-2,3-dicarboxylic anhydride), methyl Nadic anhydride, tetrahydrophthalic anhydride, or methyltetrahydrophthalic anhydride; or a mixture of 2 or more thereof. Of these unsaturated carboxylic acids and acid anhydrides thereof, maleic acid, maleic anhydride, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.1 to about 2 parts of radically polymerizable unsaturated grafting compound per 100 parts of polymer (phr), preferably in the range of about 0.2 to about 1.6 phr, and most preferably in the range of about 0.4 to about 1.2 phr. If too much grafting compound is used not all of the grafting compound will be grafted onto the polymer and no additional appreciable polymer property improvement is obtained. If too little grafting compound is used no appreciable improvement or enhancement of polymer properties is noted.

The grafting reaction must occur in the presence of a free radical generator, also called a free radical initiator. An organic peroxide is preferably used as the free-radical initiator in the graft modification reaction as described above. More specifically, preferred examples of an organic peroxide include, but are not limited to an alkyl peroxide, an aryl peroxide, an acyl peroxide, an aroyl peroxide, a ketone peroxide, a peroxycarbonate, a peroxycarboxylate, a hydroperoxide, and other organic peroxides. Examples of an alkyl peroxide include diisopropyl peroxide; di-tert-butyl peroxide; 2,5-dimethyl-2,5-(di-tert-butylperoxy)hexyne-3; a,a'-bis(tert-butylperoxy)diisopropyl benzene; and 2,5-dimethyl-2,5-(di-tert-butylperoxy)hexane. An example of an aryl peroxide is dicumyl peroxide. An example of an acyl peroxide is dilauroyl peroxide. An example of an aroyl peroxide is dibenzoyl peroxide. Examples of a ketone peroxide include methyl ethyl ketone peroxide and cyclohexanone peroxide. Examples of hydroperoxide include tert-butyl hydroperoxide and cumene hydroperoxide. Preferred examples of a free-radical initiator are di-tert-butyl peroxide; 2,5-dimethyl-2,5-(di-tert-butylperoxy)-hexyne-3; 2,5-dimethyl-2,5-(di-tert-butyl-peroxy)hexane, dicumyl peroxide; dibenzoyl peroxide; a,a'-bis(tert-butylperoxy)diisopropylbenzene; and mixtures thereof. Higher molecular weight organic peroxide compounds are preferred because they are safer and easier to handle and store, as well as being more stable at higher temperatures.

The organic peroxide is present in the grafting reaction in an amount sufficient to effectuate a grafting reaction. Usually, the amount is in the range of about 0.001 to about 5 parts of organic peroxide per 100 parts polymer (phr), preferably in the range of about 0.001 to about 1 phr, and most preferably in the range of about 0.005 to about 0.4 phr. Too much organic peroxide can still initiate the grafting reaction, but polymer degradation, such as vis-breaking of the polymer, can occur. Too low of a concentration of organic peroxide does not initiate the grafting reaction.

The grafting reaction must occur in the polymer melt. Thus, the temperature of the reaction is in the range from about the polymer melting point to about the polymer decomposition temperature. Preferably, the reaction temperature is in the range from about 20° C. above the polymer melting point to about the decomposition temperature of the polymer. Most preferably, the lower end of the temperature range is utilized to minimize any thermal degradation effects to the polymer.

The time required for the grafting reaction is a length sufficient for the grafting to occur. Usually, the time is in the range of about 10 seconds to about 30 hours, preferably in the range of from about 15 seconds to about 3 hours. Most preferably, the reaction time is in the range of from about 30 seconds to about 10 minutes. Shorter times, such as less than 5 minutes, are preferred to minimize thermal degradation effects to the polymer. After the grafting reaction has been allowed to proceed sufficiently, the aliphatic thio compound, and optionally a reinforcer, can be added.

The grafting reaction can be carried out by both batch and continuous processes, as long as all components are well dispersed and well blended. A continuous process is preferred for ease of operation.

Reinforcing

The grafted, or modified, stabilized stereoregular polymers of higher alpha-olefins optionally can be reinforced with a reinforcing agent, such as glass fibers. The glass fiber reinforcement improves the polymer properties, such as the thermal properties of the polymer. Glass fiber reinforcements are available in a variety of compositions, filament diameters, sizings, and forms. The most commonly used composition for reinforced thermoplastics is E glass, a boroaluminosilicate. The diameter of the glass fiber is preferably less than 20 $\mu$m, but may vary from about 3 to about 30 $\mu$m. Glass fiber diameters are usually given a letter designation between A and Z. The most common diameters encountered in glass reinforced thermoplastics are G-filament (about 9 $\mu$m) and K-filament (about 13 $\mu$m). Several types of glass fiber products can be used for reinforcing thermoplastics. These include yarn, woven fabrics, continuous roving, chopped stand, mats, etc. Continuous filament strands are generally cut into lengths of ⅛, 3/16, ¼, ⅓, ½, and 1 inch or longer for compounding efficacy in various processes and products. The glass fiber products are usually sized during the fiber formation process or in a posttreatment. Sizing compositions usually contain a lubricant, which provides the protection for the glass fiber strand; a film-former or binder that gives the glass fiber strand integrity and workability; and a coupling agent that provides better adhesion between the glass fiber strand and the polymeric materials that are reinforced with the glass fiber strand. Additional agents that may be used in sizing compositions include emulsifiers, wetting agents, nucleating agents, and the like. The amount of sizing on the glass fiber product typically ranges from about 0.2 to 1.5 weight percent, although loadings up to 10 percent may be added to mat products. Examples of film-formers include polyesters, epoxy resins, polyurethanes, polyacrylates, polyvinyl acetates, polyvinyl alcohols, starches, and the like. Usually the coupling agent is a silane coupling agent that has a hydrolyzable moiety for bonding to the glass and a reactive organic moiety that is compatible with the polymeric material that is to be reinforced with the glass fibers.

If the polymer is to contain glass fibers, they should be present in the range of about 10 to about 200 parts by weight of glass fiber per 100 parts by weight of polymer (phr). Preferably, the glass fibers are present in the range of about 10 to about 120 phr, and most preferably present in the range of about 10 to about 80 phr. Expressed in other terms, the glass fibers, if used, are present in about 10 to about 67 weight percent, based on the weight of the total product. Preferably, the glass fibers are present in the range of about 10 to about 55 weight percent, and most preferably in the range of about 10 to about 45 weight percent. Not enough glass fiber does not improve the polymer properties and too much glass fiber results in not enough polymer to coat the glass fiber, i.e., the fibers are not "wetted out".

Similar to the grafting process, the fibers can be added any time after the polymer has been initially stabilized with the hindered phenol prophylactic charge. Batch and/or continuous processes can be used, as long as all components are well dispersed and well blended. A continuous process is preferred for ease of operation. For example, the reactants can be added sequentially wherein, for example, the grafting reaction occurs first, and additional stabilizer(s) and glass fibers are added downstream from the extruder as long as the grafting reaction occurs before the addition of the aliphatic thio compound and the grafting reaction is given enough time to proceed. For ease of operation, all components except the aliphatic thio compound and glass fibers, are first dry mixed. The aliphatic thio compound and glass fibers are than added after the grafting reaction has occurred.

EXAMPLES

These examples are provided to further assist a person skilled in the art with understanding this invention. The particular reactants, conditions, and the like, are intended to be merely illustrative of this invention and are not meant to be construed as unduly limiting the reasonable scope of this invention.

The polymethylpentene (PMP) used in the following example was prepared from 4-methyl-1-pentene (4MP1) by conventional polymerization processes such as U.S. Pat. No. 4,342,854. The undried polymer was stabilized immediately after polymerization by mixing the polymer with a solution of a hindered phenolic prophylactic stabilizer (octadecyl 3-(3,5-di-tert-butyl-4-hydroxyphenyl) proprionate) and other stabilizers known in the art. These combined solutions were then dried to remove the liquids and produce a treated, stabilized polymer. These polymers had a nominal melt index of about 20 grams/10 minutes. These melt indexes were measured according to ASTM Method D1238 using a 5 kilogram weight at 260° C.

In runs 1 through 4, 100 parts of treated, stabilized polymer were mixed with additional components, except glass fibers, in amounts given in parts per 100 parts of resin, as listed in the table. The components were dried mixed for about 1 hour at about 25° C. by drum tumbling to insure thorough mixing. The glass fibers were then added to the mixture and drum tumbled just long enough to effect mixing of the glass fibers and polymer mixture without significant breakup of the glass fiber bundles. This lasted approximately 1 to 3 minutes.

The resulting dry blend mixture was pelletized into 3 mm diameter by about 3 mm long pellets by feeding the mixture into a Werner and Pfleiderer ZSK-30 twin screw extruder equipped with a general purpose compounding barrel/screw configuration. The extruder had a barrel temperature profile of 250° to 290° C. and a screw speed of 250 rpms. The resultant pellets were dried for 12 hours at 110° C. in the presence of air to remove residual moisture.

The pellets were then injection molded in a 55-ton Engel model EC88 injection molding machine with a mold temperature of 150° F. (66° C.) and a barrel temperature of 560° F. (293° C.). An ASTM test specimen mold was used to form Type IV tensile bars (1/16 inch thick) and flexural bars (5 inches long by ⅓ inches wide by ⅛ inches thick) which were used for testing.

In inventive run 5, 100 parts of treated, stabilized polymer were mixed with the additional components except for glass fillers and the aliphatic thio compound, in amounts given in parts per 100 parts resin, as listed in the table. The components were dry mixed in a Henshel mixer for 5 minutes at about 25° C. at a speed of about 2500 rpms.

The resultant dry blend mixture was fed into a Baker-Perkins BP-50 corotating, twin screw compounder. The glass fibers and aliphatic thio compound were fed into the extruder after the grafting reaction with a downstream feeder which was positioned halfway between the main feed port and discharge of the compounder. The compounder had a barrel temperature profile of 265° to 280° C. and a screw speed of 450 rpm. The compound was pelletized into 3 mm diameter by about 3 mm long pellets. The pellets were dried for 12 hours at 110° C. in the presence of air to remove residual moisture. The pellets were then injection molded into ASTM test specimens as done before in runs 1 through 4.

TABLE ONE

The Effects of Addition of an Aliphatic Thio Compound to 30% Glass Reinforced, Silane Grafted Polymethylpentene Properties

| | Runs (amounts in phr) | | | | |
|---|---|---|---|---|---|
| | Run 1 | Run 2 | Run 3 | Run 4 | Run 5 |
| PMP[1] | 100.00 | 100.00 | 100.00 | 100.00 | 100.00 |
| Silane[2] | 0.50 | 0.50 | 0.50 | 0.50 | 0.50 |
| Peroxide[3] | 0.10 | 0.10 | 0.10 | 0.10 | 0.10 |
| Glass[4] | 43.20 | 43.20 | 43.20 | 43.20 | 43.20 |
| Hindered phenolic[5] | 0.25 | 0.50 | 0.10 | 0.50 | 0.50 |
| ATC[6] | 0 | 0 | 0.30 | 1.50 | 0.50 |
| TS[7] | 8,900 | 9,500 | 8,200 | 8,000 | 9,000 |
| E[8] | 3.5 | 3.9 | 2.7 | 3.1 | 5.9 |
| FS[9] | 12,700 | 12,700 | 11,300 | 10,200 | 11,700 |
| FM[10] | 765 | 714 | 752 | 671 | 653 |
| IN[11] | 1.1 | 1.0 | 0.9 | 0.8 | 1.2 |
| IU[11] | 3.5 | 3.3 | 3.2 | 2.4 | 3.2 |
| HDT[12] | 187 | 190 | 179 | 156 | 188 |

[1] Polymethylpentene homopolymer; nominal 20 g/10 min melt flow rate according to ASTM method D1238 using a 5 kg weight and 260° C. temperature.
[2] 3-methacryloxypropyltrimethoxysilane.
[3] 2,5-dimethyl-2,5-(di-tert-butylperoxy)hexane.
[4] Owens-Corning 457BA glass fibers, sized for polypropylene, about 13 micrometers.
[5] Tetrakis (methylene 3-(3,5-di-tert-butyl-4-hydroxyphenyl) proprionate) methane.
[6] Aliphatic thio compound. Anoxsyn ™ 442 aliphatic compound from Atochem North America.
[7] Tensile strength at break according to ASTM method D638 at 5 mm/min in psi.
[8] Elongation at break according to ASTM method D638 at 5 mm/min in %.
[9] Flexural strength according to ASTM method D790, 2-inch span, at 1 mm/min in psi.
[10] Flexural modulus according to ASTM method D790, 1-inch span, at 1 mm/min in 1000 psi.
[11] Izod impact strength, notched and unnotched, according to ASTM D256 in ft-lb/in.
[12] Heat deflection temperature under 264 psi load according to ASTM D648 in °C.

Runs 1 and 2 illustrate the properties of a stereoregular, higher, branched alpha-olefin when grafted. Runs 3 and 4 illustrate the effect of adding the aliphatic thio compound before or concurrently with the grafting procedure. This shows that contrary to the teachings in the art, aliphatic thio compounds will interfere with the grafting reactions of polyolefins. It is interesting to note that with few exceptions, the data suggests that increasing the level of the aliphatic thio compound in the stereoregular, higher, branched alpha-olefin, increased the detrimental effect of the aliphatic thio compound. However, in inventive run 5, where the aliphatic thio compound was added after the grafting reaction occurred, some of the mechanical properties came close to achieving the mechanical properties of the polymer in runs 1 and 2. For example, the tensile strength in run 5 approached the tensile strength of runs 1 and 2. Additionally, the flexural strength, the izod notched test, and the heat deflection temperature test were all improved over runs 3 and 4. Thus, this invention provides a process to maximize the benefit of adding an aliphatic thio compound.

The most preferred hindered phenol antioxidant used in addition to the prophylatic charge is tetrakis(methylene 3-(3,5-di-tert-butyl-4-hydroxyphenyl)propionate)methane. The main reason for this preference is due to the interaction between this molecule and the aliphatic thio compounds used in this invention. For example, table two below shows that this hindered phenol and Anoxsyn ™ 442 imparted excellent long term heat aging (LTHA) stability to injected molded samples of a glass reinforced polymethylpentene composition. This system proved to be more effective than other hindered phenol type systems as shown in the table.

TABLE TWO

Preliminary Study:
Stabilizer Packages for LTHA Stabilization of PMP Compositions

| | | Tensile Strength, Break (psi × $10^{-3}$) Hours @ 150° C. | | | | | | | | |
|---|---|---|---|---|---|---|---|---|---|---|
| | | 0 | 500 | 747 | 1004 | 1104 | 1178 | 1250 | 1316 | 1412 |
| Run 1 Components (phr) | | | | | | | | | | |
| PMP | 100 | 7.0 | 7.8 | 7.8 | 7.9 | 7.8 | 7.9 | 7.6 | 5.2 | 4.8 |
| Zinc Stearate | 0.1 | | | | | | | | | |
| Irganox 1010[a] | 0.3 | | | | | | | | | |
| ATC[b] | 0.9 | | | | | | | | | |
| Glass[e] | 44 | | | | | | | | | |
| Run 2 Components (phr) | | | | | | | | | | |
| PMP | 100 | 7.2 | 7.8 | 8.5 | 5.4 | | | | | |
| Zinc Stearate | 0.1 | | | | | | | | | |
| Irganox 1330[c] | 0.3 | | | | | | | | | |
| ATC[a] | 0.9 | | | | | | | | | |
| Glass | 44 | | | | | | | | | |
| Run 3 Components (phr) | | | | | | | | | | |
| PMP | 100 | 6.9 | 8.1 | 8.1 | 3.4 | | | | | |
| Zinc Stearate | 0.1 | | | | | | | | | |
| Irganox 1010 | 0.3 | | | | | | | | | |
| DLTDP[d] | 0.9 | | | | | | | | | |
| Glass | 44 | | | | | | | | | |
| Run 4 Components (phr) | | | | | | | | | | |
| PMP | 100 | 6.9 | 8.3 | 2.3 | | | | | | |
| Zinc Stearate | 0.1 | | | | | | | | | |
| Irganox 1330 | 0.3 | | | | | | | | | |
| DLTDP | 0.9 | | | | | | | | | |
| Glass | 44 | | | | | | | | | |

[a]Irganox 1010: tetrakis (methylene 3-(3,5-di-tert-butyl-4-hydroxyphenyl)propionate)methane (Ciba-Geigy).
[b]Anoxsyn ™ 442 aliphatic thio compound from Atochem North America.
[c]Irganox 1330: 1,3,5-trimethyl-2,4,6-tris(3,5-di-tert-butyl-4-hydroxybenzyl)benzene (Ciba-Geigy).
[d]Cyanox LDTP: dilaurylthiodipropionate (Cyanamid).
[e]OCF 457BA 3/16" chopped strand.

Referring to runs 1, 2, 3, and 4 in table two, it can be seen from the retention of tensile strength values that the Irganox 1010/Anoxsyn ™ 442 package was the most effective long term heat aging stabilizer for glass reinforced PMP compositions. At 1250 hours of thermal aging in run 1, the tensile strength was still greater than the initial tensile strength. The stabilizer packages in runs 2 and 3 failed to reach the 1004 hour level and run 4 failed to reach the 747 hour level of testing. Therefore, based on these results the Irganox 1010/Anoxsyn ™ 442 (aliphatic thio compound) is a preferred combination for use in this invention.

That which is claimed is:
1. A process comprising:
   (a) blending
      (1) a stereoregular polymer of at least one branched, higher alpha-olefin wherein said polymer is stabilized with about 0.1 to about 1 parts by weight of a hindered phenol per 100 parts by weight of said polymer; with
      (2) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
      (3) in the presence of a free radical generator;
      (4) in a melt at a temperature in the range of the melting temperature of the polymer to about the decomposition temperature of the polymer; and
   (b) thereafter combining said melt with an aliphatic thio compound described by the formula $C_aH_{2a+1}$—S—R—S—$C_bH_{2b+1}$, wherein a is independently an integer from 4 to 30 inclusive, b is independently an integer from 4 to 30 inclusive, R is a chained or cyclic hydrocarbon radical represented by either $C_dH_{2d}$ or $C_gH_{2g-2}$, and d or g is independently an integer from 3 to 12 inclusive.

2. A process according to claim 1 further comprising incorporating a glass fiber reinforcement in said polymer.

3. A process according to claim 2 wherein said reinforcement is incorporated along with said aliphatic thio compound.

4. A process according to claim 1 wherein said polymer further comprises a branched alpha olefin having from about 5 to about 12 carbon atoms.

5. A process according to claim 1 wherein said polymer has a melting point of greater than about 190° C.

6. A process according to claim 1 wherein said branched, higher alpha-olefin is selected from the group consisting of 3-methyl-1-butene; 3-methyl-1-pentene; 4-methyl-1-pentene; 3-methyl-1-hexene; 3,3-dimethyl-1-butene; 4,4-dimethyl-1-hexene; 3-ethyl-1-hexene and mixtures thereof.

7. A process according to claim 1 wherein said branched, higher alpha-olefin is 4-methyl-1-pentene.

8. A process according to claim 1 wherein said branched, higher alpha-olefin is 3-methyl-1-butene.

9. A process according to claim 1 wherein said branched, higher alpha-olefin is 3-ethyl-1-hexene.

10. A process according to claim 1 wherein said polymer is a copolymer of said branched, higher alpha-olefin and another linear alpha-olefin having from about 8 to about 16 carbon atoms.

11. A process according to claim 1 wherein said hindered phenol is selected from the group consisting of 2,6-di-tert-butyl-4-methylphenol; tetrakis(methylene 3-(3,5-di-tert-butyl-4-hydroxyphenyl)propionate) methane; octadecyl 3-(3,3-di-tert-butyl-4-hydroxyphenyl)-propionate; and mixtures thereof.

12. A process according to claim 1 wherein said polymer is further stabilized with a stabilizer selected from the group consisting of: other hindered phenols; organic phosphites; hindered amine light stabilizers; thioesters; and mixtures thereof.

13. A process according to claim 12 wherein said other hindered phenol is said tetrakis(methylene 3-(3,5-di-tert-butyl-4-hydroxyphenyl)-propionate) methane.

14. A process according to claim 12 wherein said stabilizer is present in said polymer in an amount of less than 2 parts by weight stabilizer per 100 parts by weight polymer.

15. A process according to claim 1 wherein said grafting compound is present in the amount in the range of about 0.2 to about 2 parts by weight grafting compound per 100 parts by weight polymer.

16. A process according to claim 1 wherein said grafting compound is a vinyl-polymerizable, unsaturated, hydrolyzable silane selected from the group consisting of vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane, and mixtures thereof.

17. A process according to claim 1 wherein said grafting compound is a carboxylic acid anhydride and is selected from the group consisting of maleic anhydride, methyl norbornene-2,3-dicarboxylic anhydride, norborene-2,3-dicarboxylic anhydride, and mixtures thereof.

18. A process according to claim 1 wherein said free radical generator is present in an amount in the range of about 0.001 to about 5 parts by weight of free radical generator per 100 parts by weight polymer.

19. A process according to claim 1 wherein said free radical generator is selected from the group consisting of di-tert-butyl peroxide; 2,5-dimethyl(2,5-di-tert-butylperoxy)hexyne-3; 2,5-dimethyl-2,5-(di-tert-butylperoxy)hexane; dicumyl peroxide; dibenzoyl peroxide; a,a'-bis(tert-butylperoxy)diisopropyl benzene; and mixtures thereof.

20. A process according to claim 1 wherein said melt is at a temperature in the range of about 20° C. above the melting point of the polymer to about the decomposition temperature of the polymer.

21. A process according to claim 2 wherein said glass fiber is present in an amount in the range of about 10 to about 200 parts by weight glass fiber per 100 parts by weight polymer.

22. A process according to claim 2 wherein said glass fiber has a diameter in the range of less than about 20 micrometers and a length greater than about 2 millimeters.

23. A process according to claim 1 wherein said polymer stabilized with said phenol, said grafting compound, and said free radical generator are dry blended prior to melting the polymer.

24. A process according to claim 1 wherein said aliphatic thio compound is $C_{18}H_{37}$—S—$C_8H_{14}$—S—$C_{18}H_{37}$.

25. A polymer composition prepared according to the process of claim 1.

26. A polymer composition prepared according to the process of claim 2.

27. An article of manufacture produced from the composition of claim 25.

28. An article of manufacture produced from the composition of claim 26.

29. A process comprising:
(a) blending
(1) a stereoregular polymer selected from the group consisting of poly(3-methyl-1-butene), poly(3-methyl-1-pentene), poly(4-methyl-1-pentene, poly(4-methyl-1-hexene), poly(3-ethyl-1-hexene), or mixtures thereof, wherein said polymer is stabilized with about 0.05 to about 2 parts by weight of a hindered phenol selected from the group consisting of 2,6-di-tert-butyl-4-methylphenol, tetrakis(methylene 3-(3,5-di-tert-butyl-4-hydroxyphenyl)propionate)methane, octadecyl 3-(3,3-di-tert-butyl-4-hydroxyphenyl)propionate, or mixtures thereof, per 100 parts by weight of said polymer; with
(2) a grafting compound selected from the group consisting of vinyltrichlorsilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane, or mixtures thereof;
(3) in the presence of a free radical generator selected from the group consisting of di-tert-butyl perooxide, 2,5-dimethyl(2,5-di-tert-butylperoxy)hexyne-3, 2,5-dimethyl-2,5-(di-tert-buthylperoxy)hexane, dicumyl peroxide, dibenzoyl peroxide, a,a'-bis(tert-butylperoxy)diisopropyl benzene, or mixtures thereof;
(4) in a melt at a temperature in the range of the melting temperature of the polymer to about the decomposition temperature of the polymer; and
(b) thereafter combining said melt with an aliphatic thio compound described by the formula $C_aH_{2a+1}$—S—R—S—$C_bH_{2b+1}$, wherein a is independently an integer from 4 to 30 inclusive, b is independently an integer from 4 to 30 inclusive, R is a chained or cyclic hydrocarbon radical represented by either $C_dH_{2d}$ or $C_gH_{2g-2}$, and d or g is independently an integer from 3 to 12 inclusive.

30. A process comprising:
(a) blending
(1) a stereoregular polymer of 4-methyl-1-pentene wherein said polymer is stabilized with about 0.05 to about 2 parts by weight of tetrakis(methylene(3,5-di-tert-butyl-4-hydroxyphenyl)proprionate) methane per 100 parts by weight of said polymer; with
(2) a grafing compound which is 3-methacryloxypropyltrimethoxysilane;
(3) in the presence of 2,5-dimethyl-2,5-(di-tert-butylpreoxy)hexane;

(4) in a melt at a temperature in the range of the melting temperature of the polymer to about the decomposition temperature of the polymer; and (b) thereafter combining said melt with an aliphatic thio compound described by the formula $C_aH_{2a+1}-S-R-S-C_bH_{2b+1}$, wherein a is independently an integer from 4 to 30 inclusive, b is independently an integer from 4 to 30 inclusive, R is a chained or cyclic hydrocarbon radical represented by either $C_dH_{2d}$ or $C_gH_{2g-2}$, and d or g is independently an integer from 3 to 12 inclusive.

* * * * *